United States Patent
Jeffries

(10) Patent No.: US 11,343,974 B1
(45) Date of Patent: May 31, 2022

(54) DEVICE ENABLING ROTATION AND MOVEMENT FOR A TRAY OF PLANTS

(71) Applicant: Jesse Jeffries, Garberville, CA (US)

(72) Inventor: Jesse Jeffries, Garberville, CA (US)

(73) Assignee: Clean Start, LLC, Garberville, CA (US)

( * ) Notice: Subject to any disclaimer, the term of this patent is extended or adjusted under 35 U.S.C. 154(b) by 0 days.

(21) Appl. No.: 17/161,296

(22) Filed: Jan. 28, 2021

(51) Int. Cl.
*A01G 7/06* (2006.01)
*A01G 9/029* (2018.01)

(52) U.S. Cl.
CPC .............. *A01G 7/06* (2013.01); *A01G 9/0299* (2018.02)

(58) Field of Classification Search
CPC ....... A01G 7/06; A01G 9/0299; A01G 31/047
USPC ............................................................. 47/1.7
See application file for complete search history.

(56) References Cited

U.S. PATENT DOCUMENTS

| | | | | |
|---|---|---|---|---|
| 3,339,308 A * | 9/1967 | Clare | ................. | A01G 31/047 47/79 |
| 3,909,978 A * | 10/1975 | Fleming | ................. | A01G 31/042 47/17 |
| 5,584,141 A * | 12/1996 | Johnson | ................. | A01G 9/00 47/65 |
| 6,557,491 B1 * | 5/2003 | Weiser | ................. | A01K 39/014 119/57.8 |
| 6,604,321 B2 * | 8/2003 | Marchildon | ......... | A01G 31/047 47/62 R |
| 2004/0060491 A1 * | 4/2004 | Leduc | ................. | A01G 31/047 111/105 |
| 2007/0251145 A1 * | 11/2007 | Brusatore | ............ | A01G 31/047 47/58.1 FV |
| 2010/0236147 A1 * | 9/2010 | Brusatore | ............ | A01G 31/047 47/65 |
| 2014/0182197 A1 * | 7/2014 | Chung | ................. | A01G 31/045 47/1.7 |
| 2016/0360711 A1 * | 12/2016 | Vesty | ................. | A01G 31/047 |
| 2018/0310497 A1 * | 11/2018 | Farmer | ................. | A01G 9/249 |
| 2018/0325053 A1 * | 11/2018 | Gallant | ................. | A01G 31/02 |
| 2019/0335681 A1 * | 11/2019 | Oberthier | ............ | A01G 31/042 |
| 2020/0187427 A1 * | 6/2020 | Brault | ................. | A01G 31/042 |
| 2020/0236865 A1 * | 7/2020 | Travaglini | ............ | A01G 31/06 |

FOREIGN PATENT DOCUMENTS

WO WO-2004045273 A1 * 6/2004 ........... A01G 31/047

* cited by examiner

*Primary Examiner* — Brady W Frazier
*Assistant Examiner* — Zoe Tam Tran
(74) *Attorney, Agent, or Firm* — Christopher Pilling

(57) ABSTRACT

A device having a hopper and a reservoir is provided enabling a tray of plants positioned in the hopper to move alone a Z-axis, and rotate about a Y-axis such that the tray of plants may enter the reservoir at a fixed positioned. The reservoir may be filled with a liquid solution indented to give a benefit to the plants. Handles connected to the hopper are biased in a top position via a pair of biasing member. The handles enable a user to operate the device by allowing the rotation and movement of the hopper during use.

3 Claims, 5 Drawing Sheets

DEVICE ENABLING ROTATION AND MOVEMENT FOR A TRAY OF PLANTS

CROSS-REFERENCE TO RELATED APPLICATIONS

N/A

BACKGROUND OF THE INVENTION

1. Field of the Invention

The present invention relates generally to devices for plants, and more particular a device enabling rotation and movement of a tray of plants.

2. Description of Related Art

Often in a plant growing process it is beneficial to spray or dip the entire plant in a liquid solution. The liquid solution may vary and aid in the plant's growth, remove or prevent pests, as well as prevent the growth of mildew and other unwanted diseases. This is usually done when the plant is small. However, when many plants need to be treated at once, this becomes a very time consuming process. Consequently, a device enabling rotation and movement of a tray of plants is provided.

BRIEF SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

In one aspect of the invention, a device enabling rotation and movement of a tray of plants is provided, the device comprising: a frame; and, a hopper configured to hold and secure a tray of plants, wherein the hopper is connected to the frame such that the hopper is enabled to travel along a Z-axis and rotate at least 180 degrees about a Y-axis.

In one embodiment, a reservoir attached to the frame such that the hopper is aligned over the reservoir is provided, wherein the reservoir is configured to retain a liquid solution. In one embodiment, wherein each plant of the tray of plants comprises foliage, a stem, and a root mass, wherein the device enables the tray of plants to travel along the Z-axis such that the foliage and the stem may enter the liquid solution but not the root mass when the hopper is rotated 180 degrees about the Y-axis. In another embodiment, the frame comprises a pair of posts. In one embodiment, the hopper comprises a securement element configured to temporally secure the tray of plants in the hopper. In one embodiment, the travel along a Z-axis is limited to a predetermined length defined by a top position and a bottom position. In yet another embodiment, a biasing member attached to the frame and the hopper is provided, wherein the biasing member is configured to apply a tension force to the hopper such that the hopper is biased in the top position. In one embodiment, the biasing member is a spring. In one embodiment, the hopper comprises a pair of handles enabling a user to rotate the hopper and move the hopper along the Z-axis. In another embodiment, the hopper has a top side and a bottom side, and the top side comprises a plurality of slots enabling each plant of the tray of plants to extend above the top side of the hopper.

The foregoing has outlined rather broadly the more pertinent and important features of the present disclosure so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present disclosure. It should be realized by those skilled in the art that such equivalent structures do not depart from the spirit and scope of the invention as set forth in the appended claims.

BRIEF DESCRIPTION OF THE SEVERAL VIEWS OF THE DRAWINGS

Other features and advantages of the present invention will become apparent when the following detailed description is read in conjunction with the accompanying drawings, in which.

DETAILED DESCRIPTION OF THE PREFERRED EMBODIMENT

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein to specifically provide a device enabling rotation and movement of a tray of plants.

Figure 1:
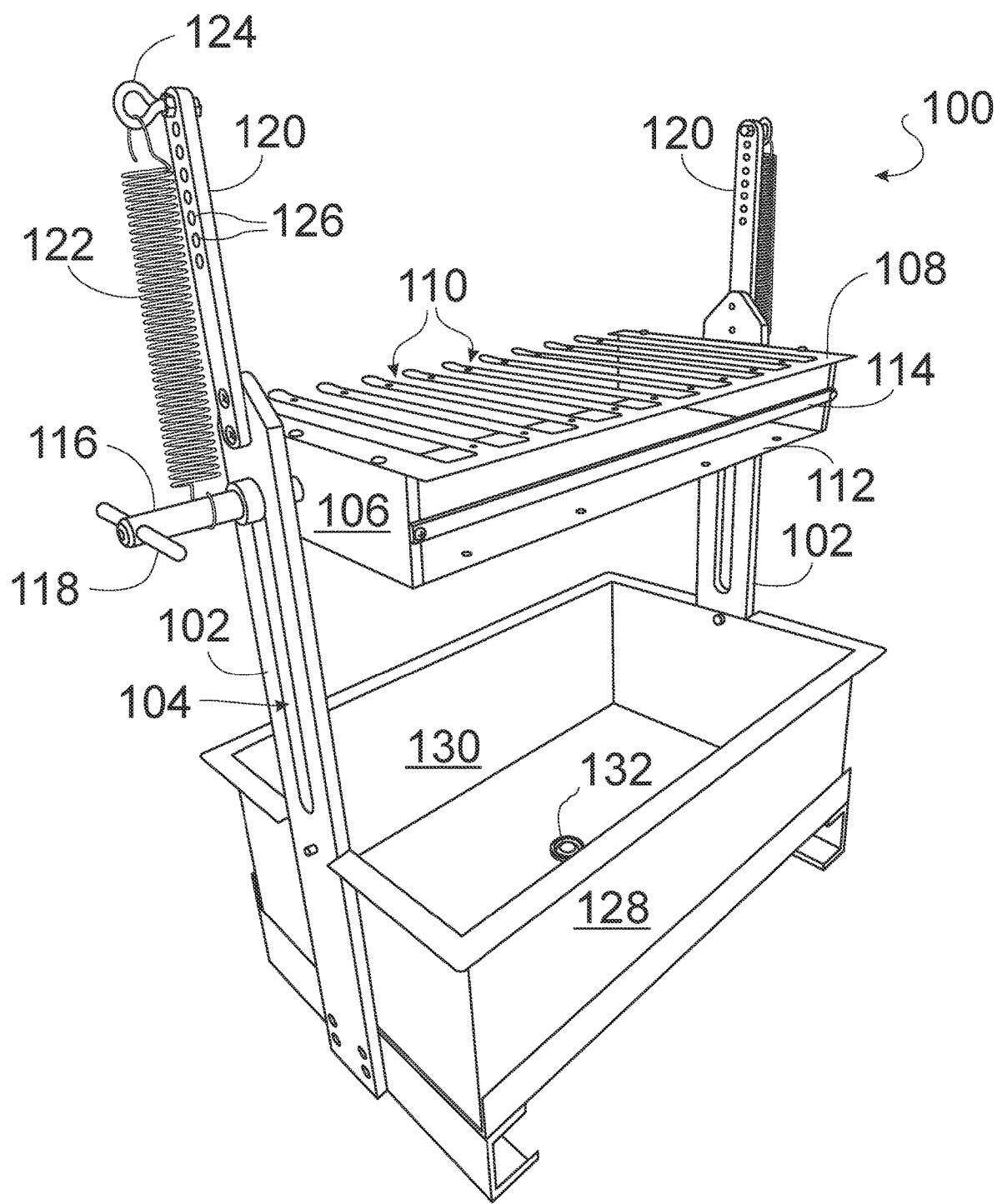
FIG. 1 is a top, rear, right side perspective view of a device enabling rotation and movement of a tray of plants according to an embodiment of the present invention.
Figure 2:
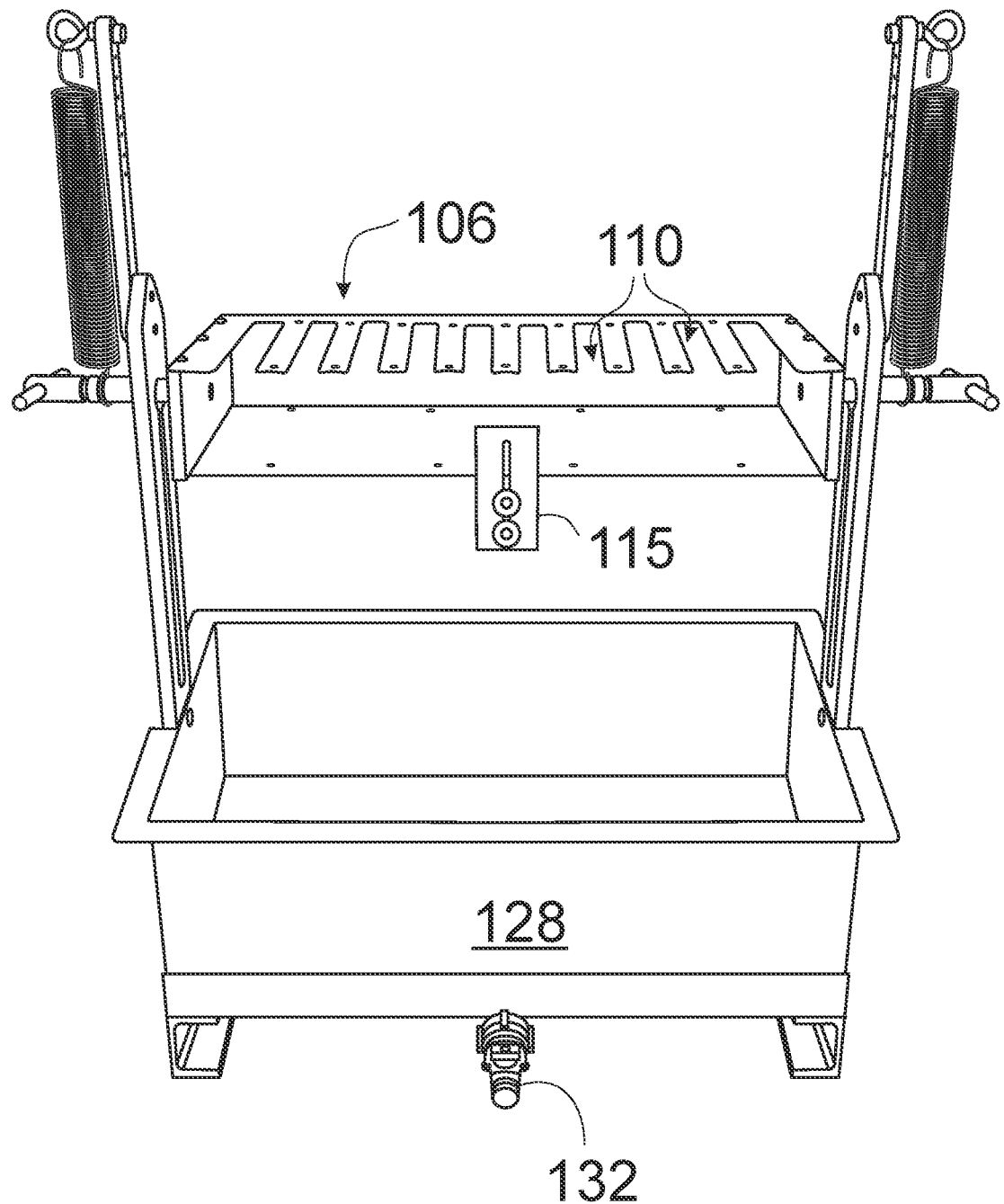
FIG. 2 is a top, front perspective view of the device according to an embodiment of the present invention.

FIGS. 1-2 illustrates various views of a device 100 enabling rotation and movement of a tray of plants according to an embodiment of the present invention. Referring now to FIGS. 1-2, the device 100 is illustrated. The device comprises a frame consisting of a pair of posts 102, wherein each post includes a slot 104 positioned vertically within the post 102. Each slot enabling a pair of handles 118 attached to a connecting shaft 116 to slide vertically (alone the Z-axis) within the slot during use. This will be discussed in greater detail below.

Figure 3:
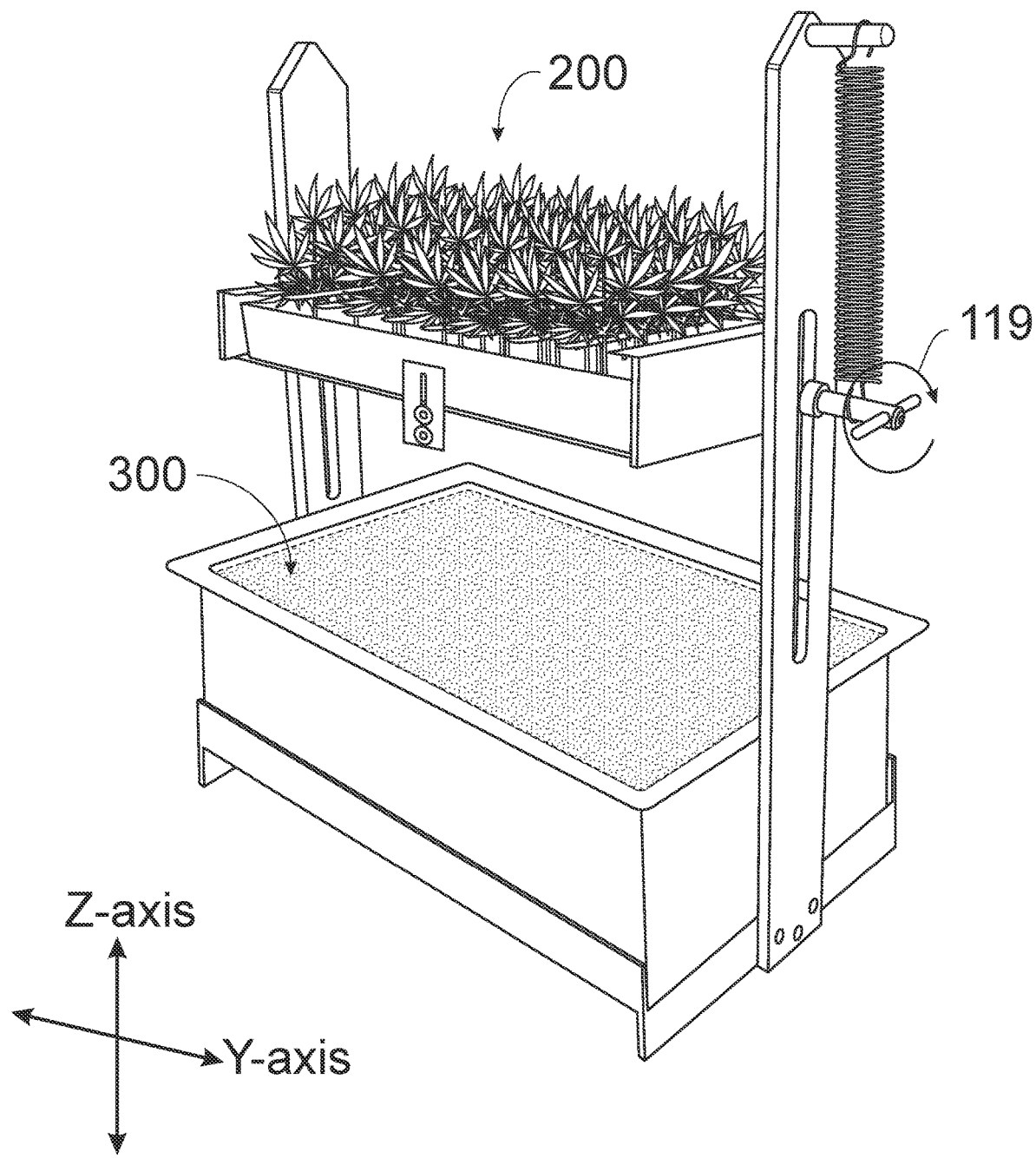
FIG. 3 is a top, front, right perspective view of the device with a tray of plants in the hopper in a upward position and a liquid solution in the reservoir embodiment of the present invention.
Figure 4:
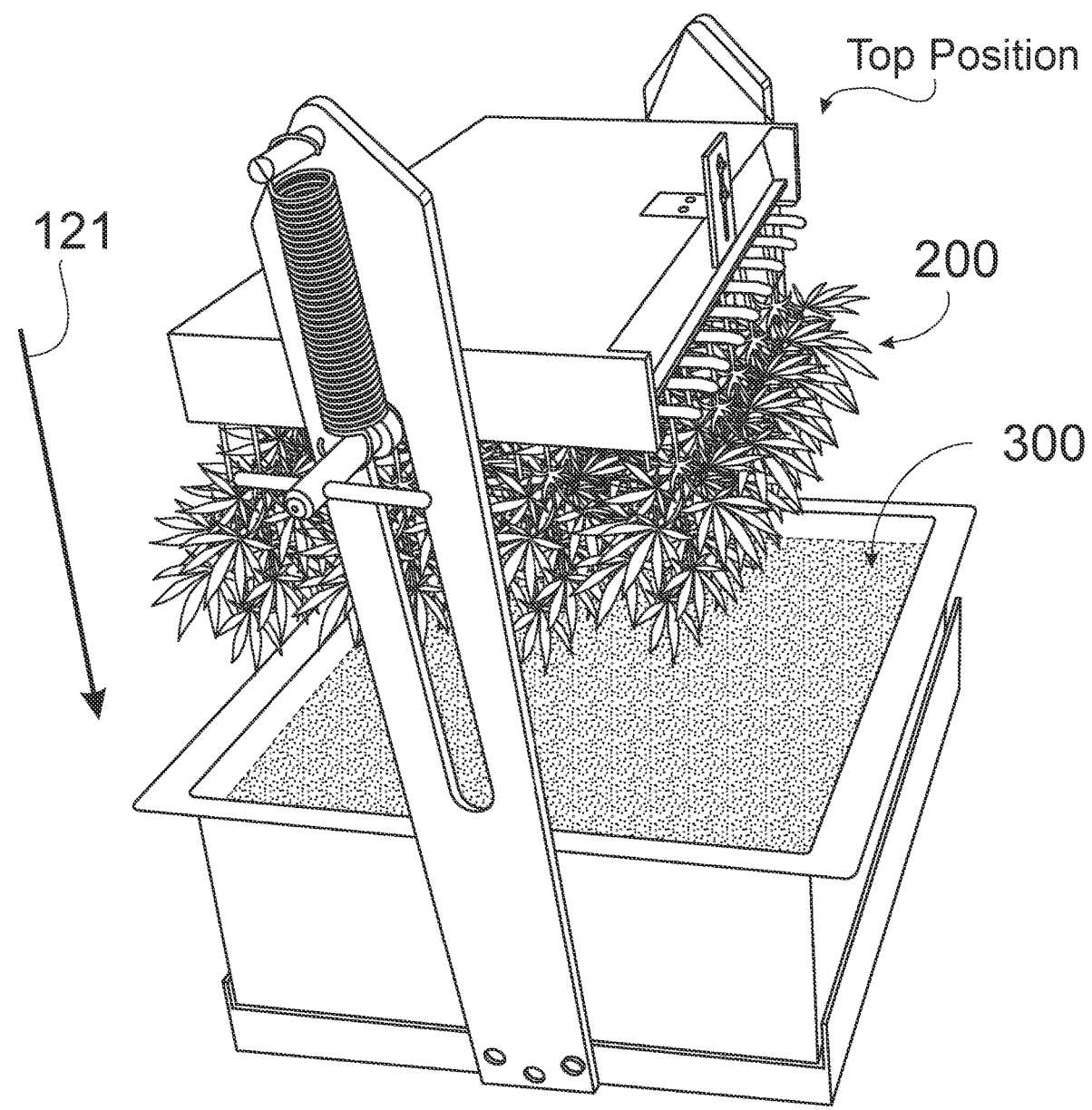
FIG. 4 is a top, front, left side perspective view of the device with the tray of plants in the hopper in a first downward position and a liquid solution in the reservoir embodiment of the present invention; and, FIG. 5 is a top, front, left side perspective view of the device with the tray of plants in the hopper in a second downward position submerged in the liquid solution in the reservoir embodiment of the present invention.
Figure 5:
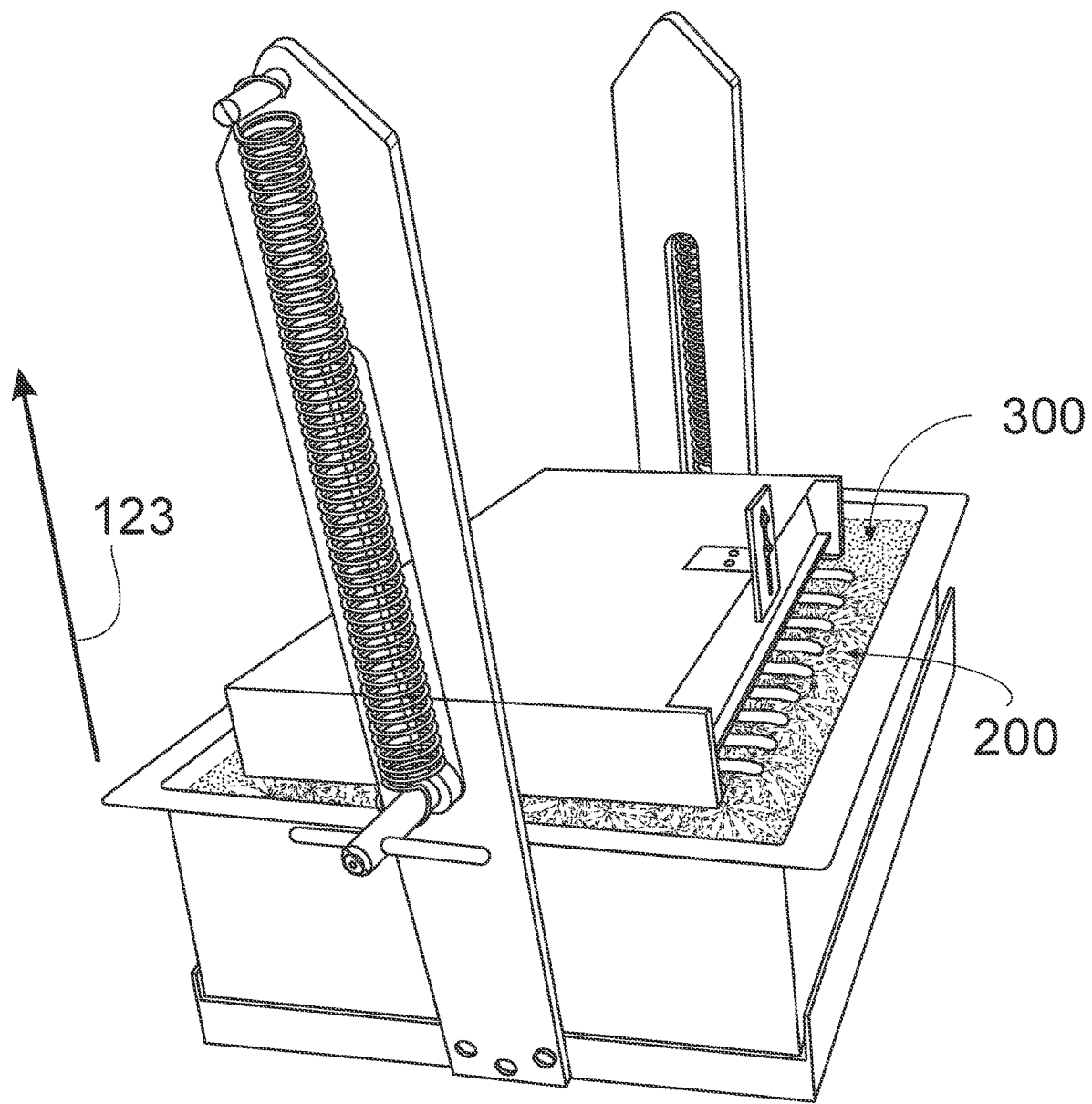

Still referring now to FIGS. 1-2, the device further comprises a hopper 106 configured to hold a tray of plants (200; as seen in FIGS. 3-5). In one embodiment, the hopper 106 comprises a top surface 108 having a plurality of slots 110 enabling at least the foliage of each plant to be exposed above the top surface 108 of the hopper. In some embodiments, at least a portion of the stem of each plant is also configured to be exposed above the top surface 108 of the hopper. In one embodiment, the hopper further comprises a bottom surface 112, a rear surface 114, and a securement element 115. During use, after the tray of plants is slid into the hopper (the front surface acts as an opening) the tray of plants sits on the bottom surface 112, and is prevented from exiting the rear of the hopper via the rear surface 114. In one embodiment, the rear surface is a partial surface as illustrated in FIG. 1. In other embodiments, the rear surface extends from the bottom surface to the top surface. In one embodiment, the securement element may be any type of fastening device configured to temporally secure the tray of plants within the hopper. In one embodiment, this is a latch, but it is understood other methods may be provided.

In one embodiment, the hopper is 14" L×24" W×8" H, but dimensions may vary depending on the intended tray size to be used in the device 100. It should be understood, that the design of the hopper may vary as long as it is configured to retain and secure a tray of plants during use.

Referring now to FIGS. 1-5, in some embodiments, the frame 102 comprises a pair of additional sections 120 configured to hold a pair of biasing members 112, wherein each biasing member 122 is attached to each connecting shaft 116 of handles 118 and hardware 124 positioned on the frame. The biasing members 112 are configured to bias the hopper in a top position (as seen in FIG. 4). Adjustments means 126 are provided to adjust the tension of the biasing member as necessary (via moving hardware 124). In one embodiment, the biasing members are springs. The biasing members should be sufficient from overcoming the tension force applied by the weight of the hopper and tray of plants such that the default position of the hopper is the top position.

In some embodiments, a reservoir 128 is provided. The reservoir having an internal volume 130 configured to hold a liquid solution 300. In one embodiment, the liquid solution may comprise an insecticide, a fungicide, a pesticide, nutrients, or any other liquid. In some embodiments, a drain 132 may be provided in the reservoir to easily remove the liquid solution after use. In one embodiment, the reservoir is attached to the frame. In this embodiment, the reservoir is positioned directly below the hopper, and sized to match the hopper's length and width such that all the plants may be submerged in the liquid solution which will be discussed in greater detail below. In one embodiment, the internal volume of the reservoir is approximately 10 gallons, but the capacity may vary without departing from the spirit and scope of the invention. In alternative embodiments, the reservoir is a separate element not attached to the frame.

During use, best seen in FIGS. 3-5, a user places a tray of plants 200 in the hopper and secures the tray within the hopper via the securement element as previously discussed. The plants may be any variety of plants, clones, seedlings or starts as well known in the art. In one embodiment, the plants are cannabis plants, but it should be understood that any variety, genus, etc. of plants may be used. Each plant of the tray of plants comprises foliage, a stem, and a root mass as well known in the art.

Next, the handles are rotated (119; FIG. 3) 180 degrees about the Y-axis which rotates the hopper and tray of plants in a downward position. In some embodiments, there is a mechanism to prevent the unwanted rotation of the handles. For example, in some embodiments, the handles might be slid at a perpendicular direction in relation to the slot 104 which enables rotation. In other embodiments, the handles may rotate freely. Next, the hopper and tray of plants via handles may be moved in a downward direction 121 towards the liquid solution 300. In some embodiments, the hopper starts at a top position as illustrated in FIG. 4. In other embodiments, this step may be combined with the previous step, i.e. the hopper may be rotated and moved in a downward direction simultaneously. The downward direction continues until the plants are submerged in the liquid solution. More specially, the device enables the tray of plants to travel along the Z-axis to a bottom position (FIG. 5) such that the foliage and the stem enter the liquid solution. Advantageously, 100% of coverage on the top and bottom of the foliage (leaves of each plant), including the stem is submersed. Dunking or submerging the plants is vastly superior to spraying the plants with the liquid solution, as the coverage is not as effective and when spraying there is the potential of getting chemicals into the root mass which could damage the plant. Finally, after the plants 200 are submerged in the liquid solution for a sufficient time allowing for full coverage of the desired portions of each plant to be submerged, the hopper is moved in an upward position 123 and rotated back such that the plants are now upright and are in the top position again. At this time, the tray of plants 200 may be removed from the hopper and the process may be repeated with an additional tray of plants. As one in the skill of art may realize, the ability to submerge a large number of plants is possible with the present invention greatly saving time compared to other known methods while reducing the possibility for plant damage.

Advantageously, the device is configured such that the bottom position limits distance the plants and hopper may be submerged such that the root mass of the plants are prevented from entering the liquid solution. In one embodiment, the device is constructed from stainless steel, however any type of material may be used.

Although the invention has been described in considerable detail in language specific to structural features, it is to be understood that the invention defined in the appended claims is not necessarily limited to the specific features described. Rather, the specific features are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) are not used to show a serial or numerical limitation but instead are used to distinguish or identify the various members of the group.

What is claimed is:

1. A device enabling rotation and movement of a tray of plants comprising:
    a frame having a pair of posts, each post having a vertical slot positioned within the post, wherein each vertical slot includes a top position and a bottom position;
    a rectangular hopper configured to hold and secure the tray of plants, the rectangular hopper having a bottom surface, a top surface, a rear surface, a pair of side surfaces, and a front opening configured to receive the tray of plants, wherein the top surface includes a plurality of slots enabling foliage of each plant on the tray of plants to be exposed above the top surface of the rectangular hopper, a latch positioned at the front opening configured to lock the tray of plants within the rectangular hopper;
    a reservoir attached to the frame such that the rectangular hoper is aligned over the reservoir, wherein the reservoir is below the bottom position and the reservoir is configured to retain a liquid solution;
    a pair of shafts attached to the pair of side surfaces, wherein the pair of shafts are configured to travel within the vertical slots;
    a pair of biasing members attached to the frame and the pair of shafts, wherein the pair of biasing members are configured to bias the pair of shafts and attached rectangular hopper in the top position;
    a pair of handles attached to the pair of shafts, wherein the pair of handles are configured to enable a user to move the rectangular hoper between the top position and the bottom position and rotate the rectangular hopper 180 degrees such that the foliage of each plant on the tray of plants is enabled to be submerged in the liquid solution.

2. The device of claim 1, wherein the pair of biasing members are springs.

3. The device of claim 1, wherein each plant further comprises a root mass positioned below the top surface of the rectangular hopper, wherein the root mass does not enter the liquid solution when the foliage is submerged in the liquid solution.

* * * * *